J. & H. Fuller.
Turbine Water Wheel.

Nº 100,746.      Patented Mar. 15, 1870.

Witnesses.
M. Vorlander
Alex. T. Roberts.

Inventor.
John Fuller
Herbert Fuller
per Munn & Co.
Att'ys

United States Patent Office.

JOHN FULLER AND HERBERT FULLER, OF LOCKINGTON, OHIO.

Letters Patent No. 100,746, dated March 15, 1870.

IMPROVEMENT IN COMBINATION WATER-WHEELS.

The Schedule referred to in these Letters Patent and making part of the same

To all whom it may concern:

Be it known that we, JOHN FULLER and HERBERT FULLER, of Lockington, in the county of Shelby, and State of Ohio, have invented a new and useful Improvement in Combination Water-Wheel; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Our invention has for its object to furnish an improved combination water-wheel, which shall be so constructed and arranged as to utilize the power that has heretofore been lost by the friction of the water upon the scroll or guide-chute, and at the same time enabling small wheels to be used, so as to obtain the desired rapidity of motion without extra gearing; and It consists in the construction and combination of the various parts of the wheel, as hereinafter more fully described.

A are the shafts, which are supported by and revolve in bearings in the frame-work B, and the lower ends of which revolve in steps, C, in the ordinary manner.

Two or more shafts A are used, according to the desired number of wheels, and they are each provided with a coupling, D, so that motion may be taken from either or all of them, as may be desired.

Figure 1:
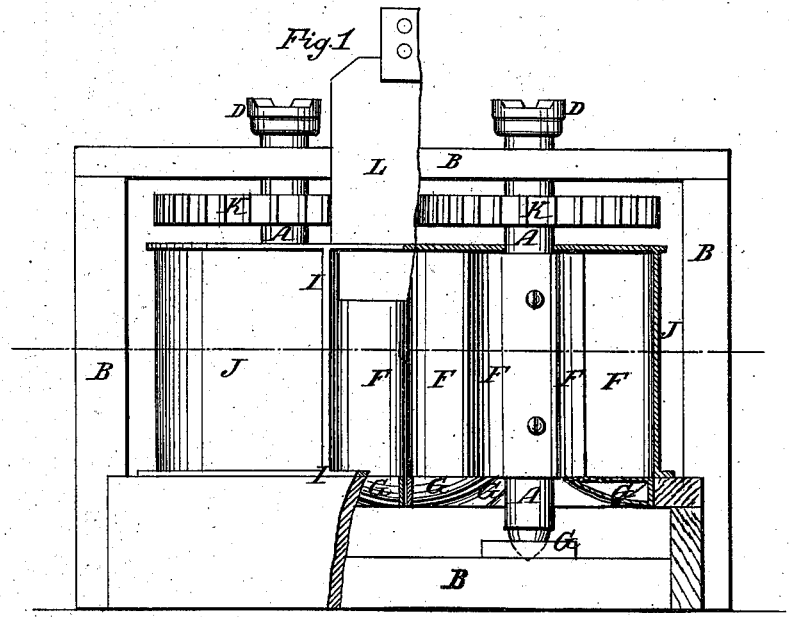
Figure 1 is a front view of our improved wheel, partly in section, to show the construction.
Figure 2:
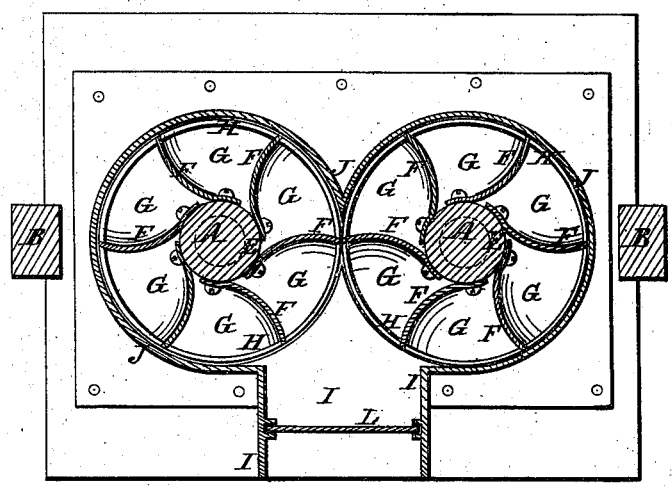
Figure 2 is a horizontal section of the same, taken through the line x x, fig. 1.

To the shafts A are attached cast-iron hubs, E, to which the buckets F are attached by screws, as shown in figs. 1 and 2.

The buckets F are made of heavy boiler-iron, and are curved as shown in fig. 2, and to their lower ends are attached, or upon them are formed curved chutes, G, extending rearward and downward, so that the water is discharged from each bucket below or nearly below the lower end of the next following bucket.

The lower outer edges of the buckets F and of the buckets or chutes G are supported and held in their proper relative positions by a rim, H.

The buckets are placed upon the adjacent shafts in a reversed position, as shown in fig. 2, and the wheels are so arranged that the edges of the buckets may coincide with each other as the wheels revolve.

I is the chute, through which the water is introduced into the wheels, and which is placed directly opposite the division-line between each two wheels, as shown in figs. 1 and 2, so that the water may strike equally and directly upon the buckets of both wheels without losing its power by friction upon scrolls or guide-chutes.

J is the casing, which entirely surrounds the wheels, except the space or spaces occupied by the chute or chutes I.

The casing J upon the side of the wheels opposite to the chute I is curved inward, so as to enter the space between the wheels at an acute angle, as shown in fig. 2, at the point where the buckets F of the two wheels begin to separate, to prevent the water from escaping at the side edges of said buckets.

When more than two wheels of buckets are used, the second chute I is placed upon the opposite side of the series of wheels from the first chute I, so that the wheel between the chutes will receive water from both chutes at the same time, but upon opposite sides and in opposite directions.

K are gear-wheels, of the same size and the same number of teeth, one of which is attached to the upper part of each shaft A, so that the wheels of buckets may all move together, and with exactly the same velocity.

L is the gate, which moves up and down vertically through the chute I, to regulate or interrupt the inflow of the water, as may be required.

This construction allows small wheels to be used, so as to obtain the desired rapidity of motion without the employment of extra gearing, and the consequent loss of power from the friction of said gearing.

Having thus described our invention,

We claim as new, and desire to secure by Letters Patent—

A pair of water-wheels, formed of hubs, E, curved buckets, F, and curved chutes, G, extending rearward and downward in the manner described.

JOHN FULLER.
HERBERT FULLER.

Witnesses:
ISAAC N. HALL,
JACOB CROPSEY.